United States Patent
Li et al.

(10) Patent No.: US 11,144,772 B2
(45) Date of Patent: Oct. 12, 2021

(54) METHOD AND SYSTEM FOR FINGERPRINT SECURITY

(71) Applicant: ZKTECO CO. LTD, Guangdong (CN)

(72) Inventors: Zhinong Li, Beijing (CN); Quanhong Che, Beijing (CN)

(73) Assignee: ZKTECO CO., LTD., Guangdong (CN)

( * ) Notice: Subject to any disclaimer, the term of this patent is extended or adjusted under 35 U.S.C. 154(b) by 87 days.

(21) Appl. No.: 16/098,276

(22) PCT Filed: Jan. 12, 2017

(86) PCT No.: PCT/CN2017/070941
§ 371 (c)(1),
(2) Date: Nov. 1, 2018

(87) PCT Pub. No.: WO2018/129687
PCT Pub. Date: Jul. 19, 2018

(65) Prior Publication Data
US 2019/0163998 A1 May 30, 2019

(51) Int. Cl.
*G06K 9/00* (2006.01)
*G06K 9/03* (2006.01)

(52) U.S. Cl.
CPC ..... *G06K 9/00899* (2013.01); *G06K 9/00087* (2013.01); *G06K 9/00255* (2013.01);
(Continued)

(58) Field of Classification Search
CPC .......... G06K 9/00899; G06K 9/036; G06K 9/00288; G06K 9/00087; G06K 9/00892; G06K 9/00255; G06K 9/00228
See application file for complete search history.

(56) References Cited

U.S. PATENT DOCUMENTS

| 8,887,259 B1 * | 11/2014 | Harding | G06F 21/6254 713/185 |
| 10,163,105 B1 * | 12/2018 | Ziraknejad | G06Q 20/4016 |

(Continued)

FOREIGN PATENT DOCUMENTS

| CN | 105303176 A | 2/2016 |
| CN | 106101135 A | 11/2016 |

(Continued)

OTHER PUBLICATIONS

International Search Report and Written Opinion dated Sep. 28, 2017 in International Application PCT/CN2017/070941.

*Primary Examiner* — Ming Y Hon
(74) *Attorney, Agent, or Firm* — Venable LLP (57) ABSTRACT

Embodiments of the present invention disclose a fingerprint anti-counterfeiting method and device used for implementing a fingerprint anti-counterfeiting function efficiently. The method in the embodiment of the present invention includes: acquiring a fingerprint image; controlling a camera to acquire a face image under a preset trigger condition; performing face identification on the face image according to a pre-stored face template; and determining the fingerprint image as an authentic fingerprint image when the face identification succeeds. As a fingerprint feature and a face feature of an identical user both can be used for uniquely identifying the user, the fingerprint feature and the face feature of the user can be associated with each other. If face identification performed on a face image according to a preset face module succeeds, it can be determined that an acquired fingerprint image is an authentic fingerprint image. Moreover, the fingerprint anti-counterfeiting device acquires a face image only under a preset trigger condition, thus restricting the degree of participation by a user when the device acquires the face image. As such, the probability of (Continued)

counterfeiting a face image is further reduced, thus achieving a highly efficient fingerprint anti-counterfeiting effect.

13 Claims, 3 Drawing Sheets

(52) U.S. Cl.
CPC ..... G06K 9/00288 (2013.01); G06K 9/00892 (2013.01); G06K 9/036 (2013.01)

(56) References Cited

U.S. PATENT DOCUMENTS

| | | | | |
|---|---|---|---|---|
| 10,523,671 B1* | 12/2019 | Whitman | ............ | H04L 63/0861 |
| 2006/0104485 A1* | 5/2006 | Miller, Jr. | .......... | G06K 9/00885 |
| | | | | 382/115 |
| 2011/0087611 A1* | 4/2011 | Chetal | .................... | G10L 17/00 |
| | | | | 705/325 |
| 2011/0321141 A1* | 12/2011 | Zeng | ................... | H04L 63/0853 |
| | | | | 726/5 |
| 2013/0027180 A1* | 1/2013 | Lakamraju | ............ | G07C 9/257 |
| | | | | 340/5.53 |
| 2013/0051632 A1* | 2/2013 | Tsai | ....................... | G06K 9/685 |
| | | | | 382/118 |
| 2013/0181838 A1* | 7/2013 | Luke | ...................... | G08B 21/24 |
| | | | | 340/572.1 |
| 2014/0189850 A1* | 7/2014 | Marshall | ................. | G06F 21/30 |
| | | | | 726/17 |
| 2014/0232526 A1* | 8/2014 | Carper | ............... | G06Q 20/1085 |
| | | | | 340/5.83 |
| 2014/0347161 A1 | 11/2014 | Sheu | | |
| 2014/0372308 A1* | 12/2014 | Sheets | .................... | G06Q 20/40 |
| | | | | 705/44 |
| 2015/0015365 A1* | 1/2015 | Ortiz | ....................... | G07C 9/25 |
| | | | | 340/5.53 |
| 2015/0046711 A1* | 2/2015 | Slaby | .................... | H04W 12/06 |
| | | | | 713/170 |
| 2016/0241542 A1* | 8/2016 | Kim | ..................... | H04L 63/083 |
| 2016/0275334 A1 | 9/2016 | Hama et al. | | |
| 2017/0011405 A1* | 1/2017 | Pandey | ............. | G06Q 20/40145 |
| 2017/0041296 A1* | 2/2017 | Ford | .................... | G06F 16/951 |
| 2017/0094049 A1* | 3/2017 | Kanevsky | ......... | H04W 12/0806 |
| 2017/0337419 A1* | 11/2017 | Zhang | ...................... | G06K 9/00 |
| 2017/0351848 A1* | 12/2017 | Bakish | .................. | G06F 21/83 |
| 2018/0004924 A1* | 1/2018 | Tieu | .................... | G06F 21/6218 |
| 2018/0091506 A1* | 3/2018 | Chow | ................... | G06Q 20/085 |

FOREIGN PATENT DOCUMENTS

| | | |
|---|---|---|
| CN | 106104574 A | 11/2016 |
| CN | 106127014 A | 11/2016 |
| KR | 20060099310 | * 9/2006 |

* cited by examiner

METHOD AND SYSTEM FOR FINGERPRINT SECURITY

CROSS REFERENCE TO RELATED APPLICATION

This application is a national stage application, filed under 35 U.S.C. § 371, of International Application No. PCT/CN2017/070941, filed on Jan. 12, 2017, which is hereby incorporated by reference in its entirety.

TECHNICAL FIELD

The present invention relates to the field of information processing, and in particular, to a fingerprint anti-counterfeiting method and device.

BACKGROUND ART

As fingerprint information is always available from people's fingers, and each person has a different fingerprint, fingerprint identification is used increasingly frequently in the information security field. However, a problem of fake fingerprints exists in the fingerprint identification. That is, after acquiring a fingerprint image of a person, a lawbreaker can make a fake fingerprint film with a special material and use the fake fingerprint film for fingerprint identification, and thus can pretend to be the authentic fingerprint user to acquire some originally unattainable permission. This causes a huge security risk.

An existing fingerprint anti-counterfeiting method mainly includes analyzing a fingerprint image, i.e., judging whether the analyzed fingerprint is a fingerprint of an authentic user according to some parameters of the fingerprint image, thus achieving an anti-counterfeiting objective.

However, in this method, a great deal of analysis work needs to be carried out on authentic fingerprint images to find out the rule from massive data and conclude a digital difference between an authentic fingerprint and a fake fingerprint, thus implementing an anti-counterfeiting function. It is difficult to implement this method, and the anti-counterfeiting effect of the method is always later than fake fingerprint implementation manners. The digital difference between an authentic fingerprint and a fake fingerprint needs to be updated and analyzed frequently. This further makes the fingerprint anti-counterfeiting method complex.

SUMMARY OF THE INVENTION

Embodiments of the present invention provide a fingerprint anti-counterfeiting method and device for implementing a fingerprint anti-counterfeiting function efficiently.

In order to solve the technical solution, the embodiments of the present invention provide the following technical solution:

A fingerprint anti-counterfeiting method is provided. The method is executed by a fingerprint anti-counterfeiting device, and the method includes:

acquiring a fingerprint image;

controlling a camera to acquire a face image under a preset trigger condition;

performing face identification on the face image according to a pre-stored face template; and determining the fingerprint image as an authentic fingerprint image when the face identification succeeds.

In order to solve the technical solution, the embodiments of the present invention provide the following technical solution:

A fingerprint anti-counterfeiting device includes:

a first acquisition unit configured to acquire a fingerprint image;

a control unit configured to control a camera to acquire a face image under a preset trigger condition;

a face identification unit configured to perform face identification on the face image according to a pre-stored face template; and a determining unit configured to determine the fingerprint image as an authentic fingerprint image when the face identification succeeds.

As can be seen from the foregoing technical solution that the embodiments of the present invention have the following advantages:

On the fingerprint anti-counterfeiting device, a fingerprint image is acquired, and a camera is controlled to acquire a face image under a preset trigger condition. Then, face identification is performed on the face image according to a pre-stored face template. When the face identification succeeds, the fingerprint image is determined as an authentic fingerprint image. As such, the authenticity of the fingerprint image is checked based on the face identification of the face image. As a fingerprint feature and a face feature of an identical user both can be used for uniquely identifying the user, the fingerprint feature and the face feature of the user can be associated with each other. If face identification performed on a face image according to a preset face module succeeds, the check effect is achieved; hence, it can be determined that an acquired fingerprint image is an authentic fingerprint image. As such, a fingerprint image counterfeited by a lawbreaker can be detected. To enable a counterfeit fingerprint image to be determined as an authentic fingerprint image, an illegal user needs to counterfeit both a fingerprint image and a face image that meet requirements, which is not easy to achieve. Moreover, the fingerprint anti-counterfeiting device acquires a face image only under a preset trigger condition, thus restricting the degree of participation by a user when the device acquires the face image. As such, the probability of counterfeiting a face image is further reduced, thus achieving a highly efficient fingerprint anti-counterfeiting effect.

DETAILED DESCRIPTION

Technical solutions in the embodiments of the present invention will be described clearly and completely below with reference to the accompanying drawings in the embodiments of the present invention. Apparently, the described embodiments are merely some embodiments rather than all embodiments of the present invention.

The terms such as "first", "second", "third" and "fourth" (if any) in the specification, the claims, and the accompanying drawings of the present invention are merely used to distinguish similar objects and are not necessarily used to describe a specific sequence or order. It should be understood that the data used in this manner can be interchanged in a proper case, so that the embodiments of the present invention described here can be implemented in sequences different from the content shown or described here. Moreover, the terms "include" and "have" as well as their other variations are intended to cover a non-exclusive inclusion. For example, a process, method, system, product or device including a series of steps or units not only includes the steps or units clearly listed, but also can include other steps or units not clearly listed or other steps or units inherent to the process, method, product or device.

The embodiments of the present invention provide a fingerprint anti-counterfeiting method and device for implementing a fingerprint anti-counterfeiting function easily.

Figure 1:
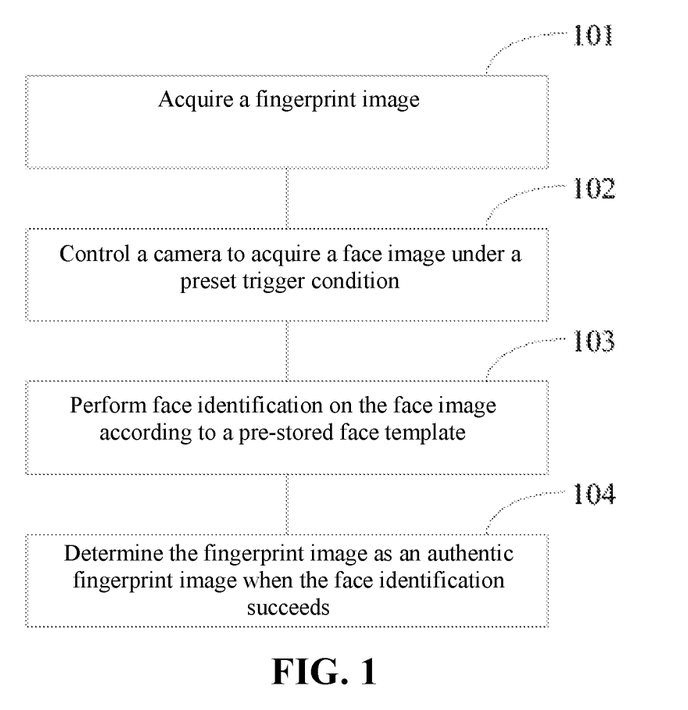
FIG. 1 is a flowchart of a fingerprint anti-counterfeiting method according to an embodiment of the present invention.

FIG. 1 is a flowchart of a fingerprint anti-counterfeiting method according to an exemplary embodiment. The method can be applied to a fingerprint anti-counterfeiting device. Referring to FIG. 1, the process of the method provided in the embodiment of the present invention includes the following steps:

Step 101: Acquire a fingerprint image.

Step 102: Control a camera to acquire a face image under a preset trigger condition.

Step 103: Perform face identification on the face image according to a pre-stored face template.

Step 104: Determine the fingerprint image as an authentic fingerprint image when the face identification succeeds.

Optionally, before the step of performing face identification on the face image according to a pre-stored face template, the method further includes:

when a target fingerprint template matching the fingerprint image is found in a pre-established database, acquiring a target face template corresponding to the target fingerprint template from the database according to a corresponding relationship between fingerprint templates and face templates, wherein the corresponding relationship between fingerprint templates and face templates is pre-stored in the database; and the step of performing face identification on the face image according to a pre-stored face template includes:

performing face identification on the face image according to the target face template.

Optionally, when the face identification succeeds, the method further includes:

replacing the target face template in a pre-established corresponding relationship between the target fingerprint template and the target face template with the face image.

Optionally, before the step of acquiring a fingerprint image, the method further includes:

acquiring the target fingerprint template;

controlling the camera to acquire the target face template under a preset trigger condition; and establishing a corresponding relationship between the target fingerprint template and the target face template.

Optionally, before the step of controlling the camera to acquire the target face template, the method further includes:

acquiring a target fingerprint image;

performing fingerprint identification on the target fingerprint image according to the target fingerprint template; and if the fingerprint identification succeeds, performing the step of establishing a corresponding relationship between the target fingerprint template and the target face template.

Optionally, before the step of replacing the target face template with the face image, the method further includes:

judging whether image quality of the face image is greater than a preset image quality threshold; and if the image quality of the face image is greater than the preset image quality threshold, performing the step of replacing the target face template with the face image.

Optionally, the fingerprint anti-counterfeiting device includes a fingerprint reader, the step of controlling a camera to acquire a face image under a preset trigger condition includes:

controlling the camera to acquire the face image when it is detected that the fingerprint reader acquires the fingerprint image.

Optionally, the step of performing face identification on the face image according to a pre-stored face template includes:

performing face identification on the face image according to a pre-stored face template group, wherein the face template group includes multiple face templates belonging to the same person; and the step of determining the fingerprint image as an authentic fingerprint image when the face identification succeeds includes:

determining the fingerprint image as an authentic fingerprint image when face identification performed on the face image according to at least one face template in the face template group succeeds.

In conclusion, on the fingerprint anti-counterfeiting device, a fingerprint image is acquired, and a camera is controlled to acquire a face image under a preset trigger condition. Then, face identification is performed on the face image according to a pre-stored face template. When the face identification succeeds, the fingerprint image is determined as an authentic fingerprint image. As such, the authenticity of the fingerprint image is checked based on the face identification of the face image. As a fingerprint feature and a face feature of an identical user both can be used for uniquely identifying the user, the fingerprint feature and the face feature of the user can be associated with each other. If face identification performed on a face image according to a preset face module succeeds, the check effect is achieved; hence, it can be determined that an acquired fingerprint image is an authentic fingerprint image. As such, a fingerprint image counterfeited by a lawbreaker can be detected. To enable a counterfeit fingerprint image to be determined as an authentic fingerprint image, an illegal user needs to counterfeit both a fingerprint image and a face image that meet requirements, which is not easy to achieve. Moreover, the fingerprint anti-counterfeiting device acquires a face image only under a preset trigger condition, thus restricting the degree of participation by a user when the device acquires the face image. As such, the probability of counterfeiting a face image is further reduced, thus achieving a highly efficient fingerprint anti-counterfeiting effect.

Figure 2:
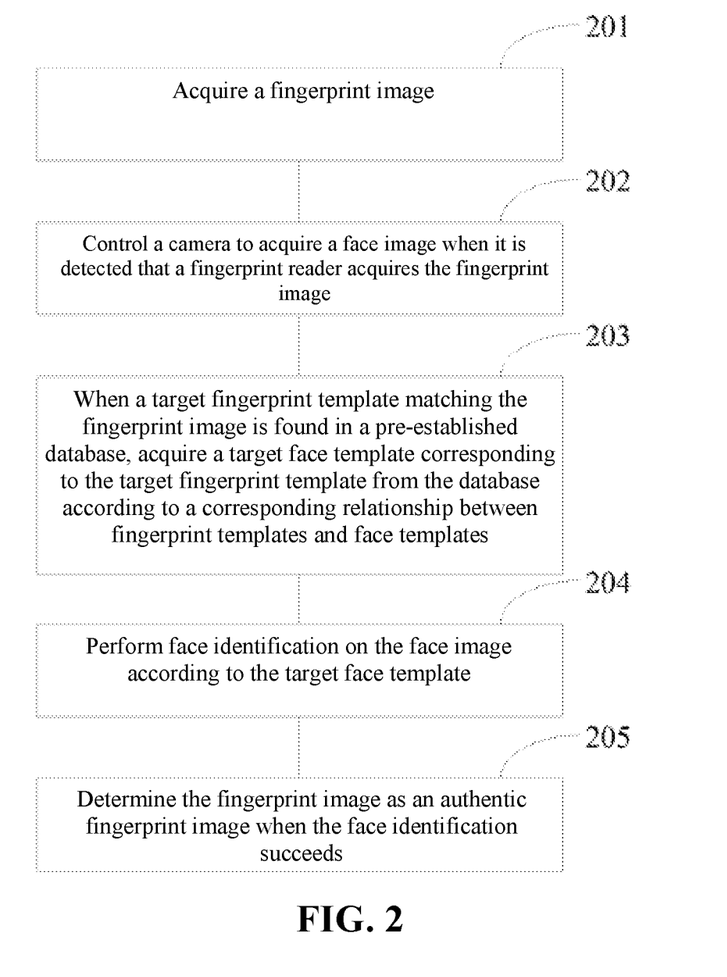
FIG. 2 is a flowchart of a fingerprint anti-counterfeiting method according to another embodiment of the present invention.

FIG. 2 is a flowchart of a fingerprint anti-counterfeiting method according to an exemplary embodiment. The method can be applied to a fingerprint anti-counterfeiting device. The method provided in the embodiment of the present invention being executed by the fingerprint anti-counterfeiting device is used as an example. Referring to FIG. 2, the process of the method provided in the embodiment of the present invention includes the following steps:

Step 201: Acquire a fingerprint image.

The fingerprint anti-counterfeiting device acquires a fingerprint image of a user to be identified.

For example, the fingerprint anti-counterfeiting device may be a device provided with a fingerprint reader. When a finger of the user is pressed on or approaches to the fingerprint reader, the fingerprint anti-counterfeiting device acquires a fingerprint image of the user through the fingerprint reader.

The fingerprint anti-counterfeiting device is a device having a fingerprint identification function and a fingerprint anti-counterfeiting function. In the embodiment of the present invention, a fingerprint anti-counterfeiting judgment is performed by means of face identification for the face image. The fingerprint anti-counterfeiting device may include a fingerprint reader configured to capture a fingerprint image of a user, a camera configured to acquire a face image of the user, a storage medium configured to store information, a processor, and the like. Definitely, the fingerprint anti-counterfeiting device may not include devices that can be disposed independently, such as a camera, but can communicate with these devices to transmit data or control instructions.

Step 202: Control a camera to acquire a face image when it is detected that a fingerprint reader acquires the fingerprint image.

The fingerprint anti-counterfeiting device detects that the fingerprint reader on the device acquires the fingerprint image. In this case, the fingerprint anti-counterfeiting device controls the camera to acquire the face image.

As such, the fingerprint image acquisition action of the fingerprint anti-counterfeiting device triggers the device to acquire the face image, so that the user does not need to trigger the device actively.

In the embodiment of the present invention, a specific method of controlling, by the fingerprint anti-counterfeiting device, the camera to acquire a face image may include: controlling the camera to acquire the face image under a preset trigger condition. The preset trigger condition is that a user to which the face image belongs does not need to cooperate with the fingerprint anti-counterfeiting device to acquire the face image, and the foregoing detection that the fingerprint reader acquires the fingerprint image is one item of the preset trigger condition. The fingerprint anti-counterfeiting device acquires the face image only under the preset trigger condition, thus restricting the degree of participation by a user when the device acquires the face image and preventing a lawbreaker from counterfeiting the face image as well. As such, the probability of counterfeiting a face image is further reduced.

It can be understood that there can be multiple types of preset trigger conditions for triggering the fingerprint anti-counterfeiting device to control the camera to acquire a face image, which are not specifically limited in the embodiment of the present invention. The preset trigger condition is a condition that a user to which the fingerprint image belongs does not need to cooperate actively. For example, a range sensor is disposed on the fingerprint anti-counterfeiting device. The preset trigger condition may be triggering the fingerprint anti-counterfeiting device to control the camera to acquire a face image when it is detected that a user approaches the fingerprint reader or the fingerprint anti-counterfeiting device; or triggering the fingerprint anti-counterfeiting device to control the camera to acquire a face image when the camera detects that a user appears at a preset position, and the like.

The preset trigger condition does not require a user to which the fingerprint image belongs to cooperate actively. For example, the preset trigger condition is implemented in various manners as described above, so that when the fingerprint anti-counterfeiting device controls the camera to acquire the face image, the user is only aware of the fingerprint identification but does not notice that his/her face image is captured, thus improving concealment of face image acquisition, preventing a user from counterfeiting a face, and improving the security of the fingerprint anti-counterfeiting in the embodiment of the present invention.

The device is triggered to control the camera to acquire the face image when the fingerprint image is acquired. The face image acquired by the camera is acquired successively or simultaneously with the fingerprint image. When a shooting direction of the camera faces the face of the user to which the fingerprint image belongs, the face image and the fingerprint image acquired by the fingerprint anti-counterfeiting device belong to the same user.

In order to make the face image acquisition imperceptive to the user so that the fingerprint anti-counterfeiting is more reliable, the camera may be disposed at a hidden position. For example, when the camera is embedded in a housing of the fingerprint anti-counterfeiting device, a filter which is flush with the surface of the housing and has a similar color is disposed at the lens of the camera, or the camera is disposed at a certain distance from the fingerprint anti-counterfeiting device, for example, disposed at the top of a wall. That is, the camera of the fingerprint anti-counterfeiting device is disposed in a hidden manner. When there are modules such as a light supplementing module cooperating with the camera, the modules are also disposed in a hidden manner, so that the user whose fingerprint is captured cannot find that the fingerprint anti-counterfeiting device includes components related to a face image.

Therefore, the fingerprint anti-counterfeiting method in the embodiment of the present invention acquires the face image without being perceived by the user, and the face image is used for face identification, so as to judge authenticity of the fingerprint according to a face identification result. The face identification result can be used for judging the authenticity of the fingerprint. The face image is acquired without being perceived by the user, so that an illegal user who counterfeits a fingerprint ignores face counterfeiting, thus improving the reliability of the face identification. Therefore, the method in the embodiment of the present invention can judge the authenticity of the fingerprint effectively.

Step 203: When a target fingerprint template matching the fingerprint image is found in a pre-established database, acquire a target face template corresponding to the target fingerprint template from the database according to a corresponding relationship between fingerprint templates and face templates.

The corresponding relationship between fingerprint templates and face templates is pre-stored in the database.

A database is established in advance. Fingerprint templates are stored in the database. The database may be set in the fingerprint anti-counterfeiting device or set in another database device, and the fingerprint anti-counterfeiting device can communicate and interact with the database device. After acquiring the fingerprint image, the fingerprint anti-counterfeiting device searches the database for a matching fingerprint template according to the fingerprint image. For example, the fingerprint image is subject to fingerprint identification with the fingerprint templates in the database one by one, until a target fingerprint template matching the fingerprint image is acquired. A corresponding relationship between fingerprint templates and face templates is further established in the database. A target face template corresponding to the target fingerprint template can be acquired according to the corresponding relationship. Hence, face identification can be performed by using the target face template.

The fingerprint template may be in the form of a fingerprint image or may be in the form of a fingerprint feature point and other forms that can record a fingerprint feature, which is not limited in the embodiment of the present invention. The fingerprint identification can include steps such as image preprocessing, extracting a feature point from a fingerprint image, and so on.

Similarly, the face template may be in the form of a face image or may be in the form of a face feature point and other forms that can record a face feature, which is not limited in the embodiment of the present invention.

If no target fingerprint template matching the fingerprint image can be acquired in the database, that is, if the device judges the fingerprint identification as failed, an operation corresponding to the fingerprint identification failure can be executed directly.

The pre-established corresponding relationship between fingerprint templates and face templates may be input to the fingerprint anti-counterfeiting device or the database after an operator of the fingerprint anti-counterfeiting device establishes the corresponding relationship. Alternatively, the corresponding relationship can also be established by the fingerprint anti-counterfeiting device in advance. For example, in some embodiments, before the step of acquiring a fingerprint image, the method in the embodiment of the present invention further includes the following steps:

Step A1: Acquire the target fingerprint template.

The fingerprint anti-counterfeiting device acquires the target fingerprint template. For example, during a fingerprint registration operation, the fingerprint anti-counterfeiting device uses an acquired fingerprint image of a user as the target fingerprint template. Definitely, the fingerprint anti-counterfeiting device can also extract key feature information of the fingerprint image and use the key feature information as a fingerprint template. The form of the target fingerprint template is not specifically limited in the embodiment of the present invention.

Step A2: Control the camera to acquire the target face template under a preset trigger condition.

For the description about the specific manner of controlling the camera to acquire the target face template in step A2, the target fingerprint template, the target face template, and the preset trigger condition for triggering the device to control the camera to acquire the target face template, reference can be made to the corresponding content in the foregoing embodiment.

For example, the acquired face image can be directly used as the target face template, or a face feature point of the face image can be extracted and used as the target face template. The target face template can also be in other forms that can record a face feature, for example, a texture feature, a face skin color, and the like.

Step A3: Establish a corresponding relationship between the target fingerprint template and the target face template.

After acquiring the target fingerprint template and the target face template, the fingerprint anti-counterfeiting device can bind the two templates to establish a corresponding relationship between the target fingerprint template and the target face template and store the corresponding relationship. Definitely, the corresponding relationship can also be bound with other user information belong to the same user and stored. For example, information such as an employee number and a name of the user is bound with the corresponding relationship between the target fingerprint template and the target face template, and is then stored.

A specific use scenario of steps A1 to A2 may be as follows: when a user registers a fingerprint through the fingerprint anti-counterfeiting device, the fingerprint anti-counterfeiting device acquires a registered fingerprint image as a target fingerprint template. At the same time, the fingerprint anti-counterfeiting device controls the camera to acquire a face image of the user, uses the face image as a target face template, stores the target face template, and creates an identity association between the target face template and the registered fingerprint. Thus, a corresponding relationship between the target fingerprint template and the target face template is established.

It can be understood that, in some embodiments, the method further includes the following step between steps A1 and A2: acquiring a target fingerprint image. In this case, there can be a time interval between the step of acquiring a target fingerprint template and the step of acquiring the target fingerprint image. For example, the target fingerprint template is acquired when the user registers the fingerprint on the fingerprint anti-counterfeiting device, and the target fingerprint image is acquired when the user performs fingerprint identification for the first time. In this case, before the step of establishing a corresponding relationship between the target fingerprint template and the target face template, the method in the embodiment of the present invention further includes: performing fingerprint identification on the target fingerprint image according to the target fingerprint template; and if the fingerprint identification succeeds, performing the step of establishing a corresponding relationship between the target fingerprint template and the target face template.

That is, when the user performs fingerprint identification, for example, when the user performs fingerprint identification for the first time or other fingerprint identification operations, in addition to a to-be-identified target fingerprint image of the user, the target face template of the user is also acquired. If the fingerprint image is identified according to the target fingerprint template successfully, it can be considered that the target fingerprint template and the target fingerprint image belong to the same user. In this case, the target face template and the target fingerprint template of the user can be bound, that is, a corresponding relationship between the target fingerprint template and the target face template is established to record information of the user, thus preparing for subsequent face identification-based fingerprint anti-counterfeiting.

Step 204: Perform face identification on the face image according to the target face template.

After the target face template is acquired, face identification can be performed on the face image according to the target face template. A specific face identification method is not limited in the embodiment of the present invention. For example, the face identification method may be overall face feature identification, identification and comparison on partial features of the face, or key point comparison and identification after key points of the face are extracted. A specific method may include preprocessing of the face image, extracting feature points from the face image, skin color analysis on the face image, or the like.

In the embodiment of the present invention, the face image is acquired under the preset trigger condition. In this case, the user does not need cooperate with the fingerprint anti-counterfeiting device in face image acquisition. The face image acquired in this manner may be adverse to face identification. In order to improve the reliability of the face identification, a face identification algorithm in method in the embodiment of the present invention supports images captured from various face image capture angles. There are two specific implementation methods. In one method, a non-front face image is corrected to obtain a front face image, and then face registration and identification are carried out. In the other method, registration and identification are directly carried out on face images from different angles.

It can be understood that, in some embodiments, the method may not include step 203; instead, face identification is directly performed on the face image according to a pre-stored face template. That is, a database including one or more face templates is established in advance, and the face template in the database is directly used for face identification. If the identification succeeds, it can be considered that a user to which the identified face image belongs is recorded in the database in advance, and a face image of a user whose face template is not recorded will be failed in identification. As such, users are screened. When the database includes a face template matching the face image, that is, face identification performed on the face image according to the pre-stored face template succeeds, it can be determined that fingerprint information of the user to which the face image belongs is authentic fingerprint information. If the face identification fails, it is determined that the fingerprint image is a counterfeited fingerprint image.

Step 205: Determine the fingerprint image as an authentic fingerprint image when the face identification succeeds.

Face identification is performed on the face image according to the target face template, and then it is judged whether the face identification succeeds. The success of the face identification, for example, may refer to that the target face template and the face image match with each other, that is, a face similarity degree of the target face template and the face image meets a preset threshold.

If the face identification succeeds, the fingerprint image is determined as an authentic fingerprint image, so as to execute a corresponding operation. For example, a permission operation corresponding to the fingerprint identification success is executed, e.g., passing a gate, or a record of the fingerprint identification success is generated, which is not specifically limited in the embodiment of the present invention.

If the face identification fails, it is determined that the fingerprint image is counterfeited, so as to execute an operation corresponding to an identification failure. For example, a prompt indicating a fingerprint identification failure is sent out, an alarm is sent out, an identification exception is recorded, and so on. Definitely, in order to improve the identification accuracy and avoid a misjudgment that occurs when the quality of the face image is adverse to face identification, the face image of the user may be acquired again or the user is prompted to perform the fingerprint acquisition operation again when the face identification fails, which is not specifically limited in the embodiment of the present invention.

After the face identification succeeds, the face image matches the target face template, the target face template and the target fingerprint template have a corresponding relationship, and the target fingerprint template matches the fingerprint image. Therefore, it can be concluded that the face image and the fingerprint image have a corresponding relationship. For example, when the target fingerprint template and the target face template belong to the same user, it can be considered that the fingerprint image and the face image belong to the same user, and the user of the target fingerprint template is the same as the user of the fingerprint image. As such, an illegal user can be prevented from passing the fingerprint identification by using a counterfeited fingerprint.

When the fingerprint image is counterfeited, for example, a fake fingerprint film can be made by using a special material after a fingerprint image of a person is acquired, an illegal user can use the fake fingerprint film to pass the fingerprint identification. If merely the fingerprint identification is carried out, the illegal user can pretend to be an authentic fingerprint user to acquire some originally unattainable permission, causing a huge security risk. However, in method according to the embodiment of the present invention, a face image of the illegal user is acquired by the fingerprint anti-counterfeiting device. Even if the fingerprint identification succeeds, after a corresponding target face template is acquired according to a corresponding relationship between face templates and fingerprint templates, the face image of the user does not match the target face template, that is, the face identification fails, because the illegal user cannot counterfeit a face. Therefore, the fingerprint image acquired by the fingerprint anti-counterfeiting device is judged as abnormal. In this case, it can be determined that the fingerprint image is a counterfeited fingerprint image. Therefore, the fingerprint anti-counterfeiting device in the embodiment of the present invention has a fingerprint anti-counterfeiting function.

In some embodiments, when the face identification succeeds, the method in the embodiment of the present invention further includes:

replacing the target face template in a pre-established corresponding relationship between the target fingerprint template and the target face template with the face image.

As such, the corresponding relationship between the target fingerprint template and the target face template can be updated in time. After the face identification succeeds, it can be ensured that the face image belongs to a legal user, that is, the user of the face image is the same as the user of the target fingerprint template. A target face image is replaced with the face image in time, and the face image is used as a new face template, so that a face recorded in the corresponding relationship between face templates and fingerprint templates is a relatively new face. The face of the user will change as the user grows older and the physical condition of the user changes. In this case, by using a relatively new face as a face template, the accuracy of subsequent face identification can be improved. After the target face template is replaced with the face image, the face image can be used for establishing the corresponding relationship in an image form, or in other forms such as a face feature point form, which are not specifically limited in the embodiment of the present invention.

When the user performs registration for the first time on the fingerprint anti-counterfeiting device, the corresponding relationship between the target fingerprint template and the target face template is established first, and then the step of replacing the target face template with the face image is performed in the subsequent acquisition and identification of the face image and the fingerprint image. Alternatively, after the target fingerprint template is acquired for use in registration, the corresponding relationship between the target fingerprint template and the target face template is established after the fingerprint identification is performed for the first time and the target fingerprint template is acquired, and then the step of replacing the target face template with the face image is performed in the subsequent acquisition and identification of the face image and the fingerprint image. The step of replacing the target face template with the face image in this embodiment of the present invention can be used in various embodiments, which is not specifically limited in the embodiment of the present invention.

Optionally, before the step of replacing the target face template with the face image, the method further includes: judging whether image quality of the face image is greater than a preset image quality threshold; and if the image quality of the face image is greater than the preset image quality threshold, performing the step of replacing the target face template with the face image.

As such, face images can be screened when the target face template is replaced with the face image, thus ensuring that the face templates in the corresponding relationship between face templates and fingerprint templates facilitate the face identification, hence reducing an error rate of the subsequent face identification.

In order to improve the accuracy rate of the face identification and reduce misjudgment, in some embodiments, multiple face templates can be used to compare with the face image. For example, in the method of the foregoing embodiment, a specific implementation method of performing face identification on the face image according to the pre-stored face template can be as follows: performing face identification on the face image according to a pre-stored face template group, wherein the face template group includes multiple face templates belonging to the same person. Therefore, the fingerprint image is determined as an authentic fingerprint image when face identification performed on the face image according to at least one face template in the face template group succeeds.

In some embodiments, the corresponding relationship between the target fingerprint template and the target face template may be a corresponding relationship between the target fingerprint template and multiple target face templates, wherein the multiple target face templates belong to the same user. Therefore, step 203 of acquiring a target face template corresponding to the target fingerprint template includes: acquiring multiple target face templates corresponding to the target fingerprint template. In the subsequent face identification step, if face identification performed on the face image by using at least one of the target face templates succeeds, the fingerprint image can be determined as an authentic fingerprint image. The multiple target face templates refer to two or more target face templates, that is, at least two target face templates.

As such, multiple face templates of the same person are used for identifying the face image, thus improving the accuracy of the face identification. The acquired face image needs to meet a high-quality requirement during identification. Besides, if the fingerprint anti-counterfeiting device acquires the face image in an imperceptive manner, the quality of the face image cannot be guaranteed. In this case, performing face identification on the face image by using multiple face templates is especially helpful for improving the identification accuracy rate.

In conclusion, on the fingerprint anti-counterfeiting device, a fingerprint image is acquired, and a camera is controlled to acquire a face image under a preset trigger condition. Then, face identification is performed on the face image according to a pre-stored face template. When the face identification succeeds, the fingerprint image is determined as an authentic fingerprint image. As such, the authenticity of the fingerprint image is checked based on the face identification of the face image. As a fingerprint feature and a face feature of an identical user both can be used for uniquely identifying the user, the fingerprint feature and the face feature of the user can be associated with each other. If face identification performed on a face image according to a preset face module succeeds, the check effect is achieved; hence, it can be determined that an acquired fingerprint image is an authentic fingerprint image. As such, a fingerprint image counterfeited by a lawbreaker can be detected. To enable a counterfeit fingerprint image to be determined as an authentic fingerprint image, an illegal user needs to counterfeit both a fingerprint image and a face image that meet requirements, which is not easy to achieve. Moreover, the fingerprint anti-counterfeiting device acquires a face image only under a preset trigger condition, thus restricting the degree of participation by a user when the device acquires the face image. As such, the probability of counterfeiting a face image is further reduced, thus achieving a highly efficient fingerprint anti-counterfeiting effect.

Figure 3:
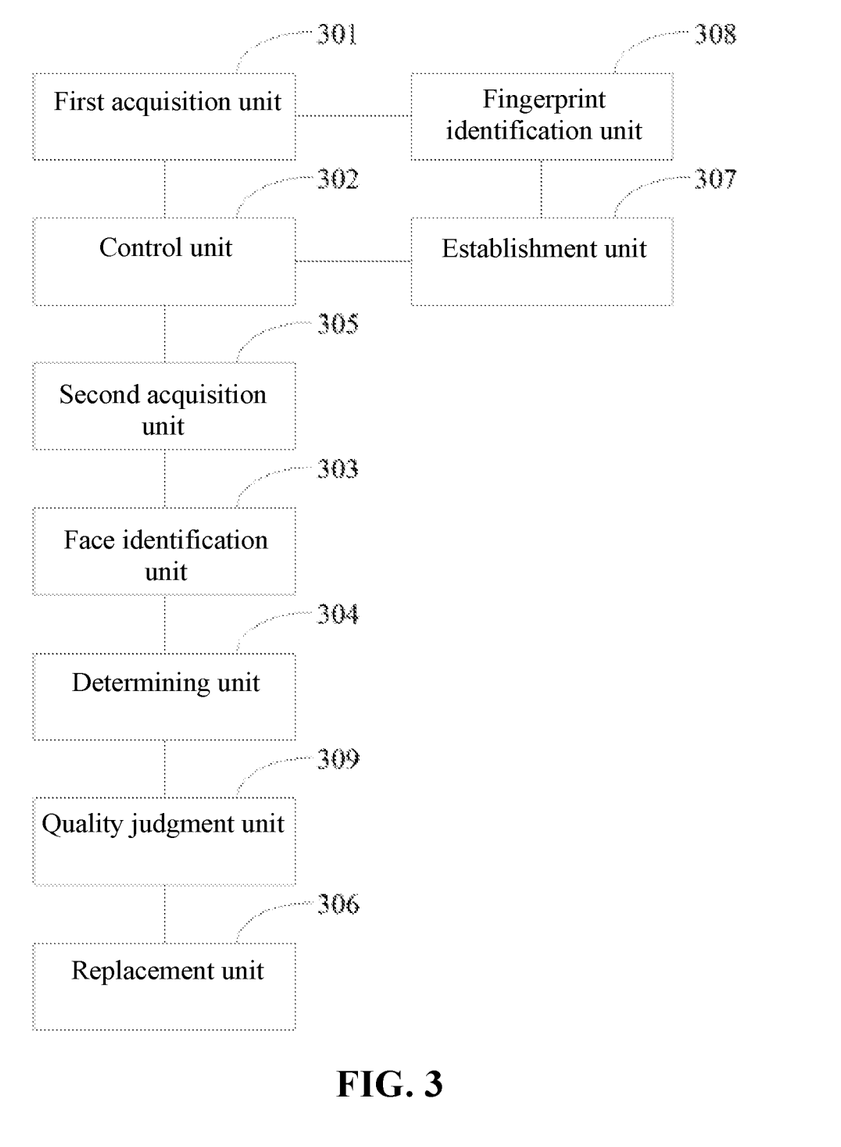
FIG. 3 is a schematic structural diagram of a fingerprint anti-counterfeiting device according to another embodiment of the present invention.

FIG. 3 is a schematic structural diagram of a fingerprint anti-counterfeiting device according to an exemplary embodiment. The device can be configured to execute the fingerprint anti-counterfeiting methods in the embodiments corresponding to FIG. 1 and FIG. 2. Referring to FIG. 3, the device includes:

a first acquisition unit 301 configured to acquire a fingerprint image;

a control unit 302 configured to control a camera to acquire a face image under a preset trigger condition;

a face identification unit 303 configured to perform face identification on the face image according to a pre-stored face template; and a determining unit 304 configured to determine the fingerprint image as an authentic fingerprint image when the face identification succeeds.

Optionally, the apparatus further includes: a second acquisition unit 305, wherein the second acquisition unit 305 is configured to: when a target fingerprint template matching the fingerprint image is found in a pre-established database, acquire a target face template corresponding to the target fingerprint template from the database according to a corresponding relationship between fingerprint templates and face templates, wherein the corresponding relationship between fingerprint templates and face templates is pre-stored in the database; and the face identification unit 303 is further configured to perform face identification on the face image according to the target face template.

Optionally, the device further includes:

a replacement unit 306 configured to: when the face identification succeeds, replace the target face template in a pre-established corresponding relationship between the target fingerprint template and the target face template with the face image.

Optionally, the device further includes: an establishment unit 307, wherein the first acquisition unit 301 is further configured to acquire the target fingerprint template;

the control unit 302 is further configured to control the camera to acquire the target face template under a preset trigger condition; and the establishment unit 307 is configured to establish a corresponding relationship between the target fingerprint template and the target face template.

Optionally, the device further includes a fingerprint identification unit 308, wherein the first acquisition unit 301 is further configured to acquire a target fingerprint image;

the fingerprint identification unit 308 is further configured to perform fingerprint identification on the target fingerprint image according to the target fingerprint template; and if the fingerprint identification succeeds, the establishment unit 307 performs the step of establishing a corresponding relationship between the target fingerprint template and the target face template.

Optionally, the device further includes:

a quality judgment unit 309 configured to judge whether image quality of the face image is greater than a preset image quality threshold; and if the image quality of the face image is greater than the preset image quality threshold, the replacement unit 306 performs the step of replacing the target face template with the face image.

Optionally, the fingerprint anti-counterfeiting device further includes a fingerprint reader, wherein the control unit 302 is further configured to control the camera to acquire the face image when it is detected that the fingerprint reader acquires the fingerprint image.

Optionally, the face identification unit 303 is further configured to perform face identification on the face image according to a pre-stored face template group, wherein the face template group includes multiple face templates belonging to the same person; and the determining unit 304 is further configured to determine the fingerprint image as an authentic fingerprint image when face identification performed on the face image according to at least one face template in the face template group succeeds.

In conclusion, on the fingerprint anti-counterfeiting device, the first acquisition unit 301 acquires a fingerprint image, and the control unit 302 controls a camera to acquire a face image under a preset trigger condition. Then, the face identification unit 303 performs face identification on the face image according to a pre-stored face template. When the face identification succeeds, the determining unit 304 determines the fingerprint image as an authentic fingerprint image. As such, the authenticity of the fingerprint image is checked based on the face identification of the face image. As a fingerprint feature and a face feature of an identical user both can be used for uniquely identifying the user, the fingerprint feature and the face feature of the user can be associated with each other. If face identification performed on a face image according to a preset face module succeeds, the check effect is achieved; hence, it can be determined that an acquired fingerprint image is an authentic fingerprint image. As such, a fingerprint image counterfeited by a lawbreaker can be detected. To enable a counterfeit fingerprint image to be determined as an authentic fingerprint image, an illegal user needs to counterfeit both a fingerprint image and a face image that meet requirements, which is not easy to achieve. Moreover, the fingerprint anti-counterfeiting device acquires a face image only under a preset trigger condition, thus restricting the degree of participation by a user when the device acquires the face image. As such, the probability of counterfeiting a face image is further reduced, thus achieving a highly efficient fingerprint anti-counterfeiting effect.

Those skilled in the art can clearly understand that, in order to make the description convenient and concise, for specific working processes of the system, apparatus, and units described above, reference can be made to the corresponding processes in the foregoing method embodiment. Details are not described here again.

In the several embodiments provided in the present application, it should be understood that the disclosed system, apparatus and method may be implemented in other manners. For example, the apparatus embodiment described above is merely schematic. For example, the unit division is merely logical function division, and there may be other division manners in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electronic form, a mechanical form, or other forms.

Units described as separate parts may or may not be physically separate, parts displayed as units may or may not be physical units, and they may be located at the same place, or distributed on multiple network units. The objective of the solution of the embodiment may be implemented by selecting some or all of the units according to actual requirements.

In addition, functional units in the embodiments of the present invention may be integrated in a processing unit, or the units may also exist physically separately, or two or more units may be integrated in one unit. The integrated unit may be implemented in the form of hardware or in the form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part making contributions to the prior art, or some or all of the technical solutions may be implemented in the form of a software product. The computer software product may be stored in a storage medium and include several instructions for instructing a computer device (which may be a personal computer, a server, a network device, or the like) to execute all or some steps of the methods of embodiments of the present invention. The foregoing storage medium includes any medium that can store program codes, such as a USB flash drive, a mobile hard disk drive, a Read-Only Memory (ROM), a Random Access Memory (RAM), a magnetic disk, or an optical disc.

The embodiments described above are merely used for illustrating rather than limiting the technical solutions of the present invention. Although the present invention is described in detail with reference to the foregoing embodiments, those skilled in the art should understand that modifications may also be made to the technical solutions recorded in the foregoing embodiments, or equivalent replacements may also be made to some of the technical features. These modifications or replacements do not cause the essence of the corresponding technical solution to depart from the spirit and scope of the technical solutions of the embodiments of the present invention.

The invention claimed is:

1. A method implemented on at least one machine, each of which has at least one processor, storage, and a communication platform connected to a network for fingerprint anti-counterfeiting, the method comprising:
   acquiring a fingerprint image of a person;
   controlling a camera to acquire a face image of the person under a preset trigger condition;

in response to the fingerprint image matching a target fingerprint template, obtaining a target face template corresponding to the target fingerprint template;

performing face identification on the face image according to the target face template corresponding to the target fingerprint template; and determining that the fingerprint image is an authentic fingerprint of the person when the face identification succeeds.

2. The method according to claim 1, wherein the step of obtaining the target face template comprises retrieving the target face template from a database storing previously paired of target fingerprint templates and target face templates.

3. The method according to claim 1, further comprising:

replacing, upon a successful face identification, the target face template in a pre-established corresponding relationship between the target fingerprint template and the target face template with the face image.

4. The method according to claim 3, wherein the step of replacing the target face template with the face image further comprises:

judging whether image quality of the face image is greater than a preset image quality threshold; and if the image quality of the face image is greater than the preset image quality threshold, performing the step of replacing the target face template with the face image.

5. The method according to claim 1, further comprising identifying, based on the fingerprint image, a pair of the target fingerprint template and the target face template corresponding to the target fingerprint template, wherein the pair of the target fingerprint template and the target face template is previously identified by:

acquiring a previous fingerprint image of the person;

generating the target fingerprint template based on the previous fingerprint image;

controlling the camera to acquire a previous face image of the person;

generating the target face template based on the previous face image; and establishing the pair based on a corresponding relationship between the target fingerprint template and the target face template.

6. The method according to claim 1, wherein the preset triggering condition includes at least one of detection of an action to acquire the fingerprint image; and detection of the person within a preset range.

7. The method according to claim 1, wherein the face image is acquired without the person's knowledge.

8. A fingerprint anti-counterfeiting device comprising:

a first acquisition unit implemented by a processor and configured to acquire a fingerprint image of a person;

a control unit implemented by the processor and configured to control a camera to acquire a face image of the person under a preset trigger condition;

a second acquisition unit implemented by the processor and configured to in response to the fingerprint image matching at least one target fingerprint template, obtain at least one target face template corresponding to the at least one target fingerprint template;

a face identification unit implemented by the processor and configured to perform face identification on the face image according to the at least one target face template corresponding to the at least one target fingerprint template; and a determining unit implemented by the processor and configured to determine that the fingerprint image is an authentic fingerprint of the person when the face identification succeeds.

9. The device according to claim 8, wherein the second acquisition unit is configured to:

obtain the at least one target face template by retrieving the at least one target face template from a database storing previously paired of target fingerprint templates and target face templates.

10. The device according to claim 8, further comprising a replacement unit implemented by the processor and configured to:

when the face identification succeeds, replace the at least one target face template in a pre-established corresponding relationship between the at least one target fingerprint template and the at least one target face template with the face image.

11. The device according to claim 8, wherein the control unit is further configured to identify, based on the fingerprint image, a pair of the at least one target fingerprint template and the at least one target face template corresponding to the at least one target fingerprint template, and wherein the pair of the at least one target fingerprint template and the at least one target face template is previously identified by acquiring a previous target fingerprint template of the person;

generating the at least one target fingerprint template based on the previous fingerprint image;

controlling the camera to acquire a previous face image of the person;

generating the at least one target face template based on the previous face image; and establishing the pair based on a corresponding relationship between the at least one target fingerprint template and the at least one target face template.

12. The device according to claim 8, wherein the face identification unit is further configured to perform face identification on the face image according to a pre-stored face template group, wherein the face template group comprises multiple face templates belonging to the person; and the determining unit is further configured to determine the fingerprint image as an authentic fingerprint image when the face identification performed on the face image according to at least one face template in the face template group succeeds.

13. The device according to claim 8, wherein the face image is acquired without the person's knowledge.

* * * * *